United States Patent
Chandrasekaran et al.

(10) Patent No.: US 11,755,183 B2
(45) Date of Patent: *Sep. 12, 2023

(54) USER FRIENDLY TARGETED METHODOLOGY FOR SATELLITE INSTALLATION USING MOBILE APP

(71) Applicant: ARRIS Enterprises LLC, Suwanee, GA (US)

(72) Inventors: Sathish Arumugam Chandrasekaran, Bangalore (IN); Muralidharan Narayanan, Bangalore (IN); Jalagandeswari Ganapathy, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,980

(22) Filed: Oct. 6, 2022

(65) Prior Publication Data

US 2023/0029958 A1    Feb. 2, 2023

Related U.S. Application Data

(63) Continuation of application No. 17/460,540, filed on Aug. 30, 2021, now Pat. No. 11,494,062.

(Continued)

(51) Int. Cl.
*H04W 88/08*    (2009.01)
*G06F 3/0484*    (2022.01)
(Continued)

(52) U.S. Cl.
CPC ......... *G06F 3/0484* (2013.01); *G06F 3/0482* (2013.01); *H04W 8/22* (2013.01);
(Continued)

(58) Field of Classification Search
CPC ...... G06F 3/0484; G06F 3/0482; H04W 8/22; H04W 16/26; H04W 84/12; H04W 88/08
See application file for complete search history.

(56) References Cited

U.S. PATENT DOCUMENTS

| | | | | |
|---|---|---|---|---|
| 11,528,273 B2* | 12/2022 | Patil | | H04W 4/70 |
| 2012/0314693 A1* | 12/2012 | Medapalli | | H04W 40/02 370/328 |

(Continued)

FOREIGN PATENT DOCUMENTS

WO    2020/132448    6/2020

OTHER PUBLICATIONS

International Search Report and Written Opinion of the International Searching Authority dated Nov. 26, 2021 in International (PCT) Application No. PCT/US2021/048171.

(Continued)

*Primary Examiner* — Hien L Duong
(74) *Attorney, Agent, or Firm* — Wenderoth, Lind & Ponack, L.L.P.

(57) ABSTRACT

A client device is provided for use with an APD and an extender. The client device includes a memory, a GUI, and a processor configured to execute instructions stored on the memory to cause the client device to: instruct the GUI to display an onboarding menu including a user selectable onboard extender icon; instruct the extender device to onboard onto the main APD, in response to a user selection of the user selectable onboard extender icon; instruct the GUI to enable the user to perform an operation while the extender device performs the onboarding onto the main APD; instruct the GUI to display a successful onboarding indication if the extender device onboards onto the main APD within a predetermined period of time, or to display a failure onboarding indication if the extender device does not (Continued)

onboard onto the main APD within the predetermined period of time.

20 Claims, 8 Drawing Sheets

Related U.S. Application Data

(60) Provisional application No. 63/093,455, filed on Oct. 19, 2020.

(51) Int. Cl.
  *G06F 3/0482* (2013.01)
  *H04W 8/22* (2009.01)
  *H04W 16/26* (2009.01)
  *H04W 84/12* (2009.01)

(52) U.S. Cl.
  CPC ............ *H04W 16/26* (2013.01); *H04W 84/12* (2013.01); *H04W 88/08* (2013.01)

(56) References Cited

U.S. PATENT DOCUMENTS

| | | |
|---|---|---|
| 2012/0331542 A1 | 12/2012 | Halpern |
| 2015/0023183 A1 | 1/2015 | Ilsar |
| 2015/0121470 A1* | 4/2015 | Rongo .................. H04L 63/083 726/4 |
| 2016/0036819 A1* | 2/2016 | Zehavi .................... H04L 67/12 726/4 |
| 2016/0037436 A1 | 2/2016 | Spencer et al. |
| 2017/0127256 A1 | 5/2017 | Hua |
| 2018/0165431 A1* | 6/2018 | Neumann ............. G06F 21/316 |
| 2018/0183666 A1 | 6/2018 | Likar et al. |
| 2019/0007842 A1 | 1/2019 | Ganu |
| 2019/0200405 A1* | 6/2019 | Gupta ................... H04W 76/10 |
| 2021/0006490 A1* | 1/2021 | Michael ............. H04L 43/0864 |

OTHER PUBLICATIONS

Wireless-N Range Extender User Manual (Comtrend Corporation, Jun. 2012) pp. 1-117 (Year: 2012).

N300 Wifi Range Extender manual by Netgear, Apr. 2014. pp. 1-36 (Year: 2014).

International Preliminary Report on Patentability and Written Opinon dated May 4, 2023 in International Application No. PCT/US2021/048171.

* cited by examiner

USER FRIENDLY TARGETED METHODOLOGY FOR SATELLITE INSTALLATION USING MOBILE APP

BACKGROUND

Embodiments of the invention relate to onboarding a Wi-Fi extender to a main APD using a client device.

SUMMARY

Aspects of the present invention are drawn to a client device for use with a main access point device (APD), and an extender device, the main APD having a host table stored therein, having a first dedicated haul, the extender device having a second dedicated haul for communication with the client device, the client device including: a memory; a graphic user interface (GUI); and a processor configured to execute instructions stored on the memory to cause the client device to: instruct the GUI to display an onboarding menu including a user selectable onboard extender icon; instruct, by way of the second dedicated haul, the extender device to onboard onto the main APD, by way of a first dedicated haul, in response to a user selection of the user selectable onboard extender icon; instruct the GUI to enable the user to perform an operation while the extender device performs the onboarding onto the main APD; instruct the GUI to display a successful onboarding indication if the extender device onboards onto the main APD within a predetermined period of time; and instruct the GUI to display a failure onboarding indication if the extender device does not onboard onto the main APD within the predetermined period of time.

In some embodiments, the processor is configured to execute instructions stored on the memory to additionally cause the client device to instruct the extender device to onboard onto the main APD wirelessly.

In some embodiments, the processor is configured to execute instructions stored on the memory to additionally cause the client device to: access the host table; determine whether the extender device onboards onto the main APD within the predetermined period of time by identifying the extender device on the host table in two consecutive instances within the predetermined period of time.

In some embodiments, the processor is configured to execute instructions stored on the memory to additionally cause the client device to instruct the GUI to additionally display troubleshooting instructions if the extender device does not onboard onto the main APD within the predetermined period of time.

Other aspects of the present disclosure are drawn to a method of using a client device with a main access point device (APD), and an extender device, the main APD having a host table stored therein, having a first dedicated haul, the extender device having a second dedicated haul for communication with the client device, the method including: instructing, via a processor configured to execute instruction stored on a memory, the GUI to display an onboarding menu including a user selectable onboard extender icon; instructing, via a processor, by way of the second dedicated haul, the extender device to onboard onto the main APD, by way of a first dedicated haul, in response to a user selection of the user selectable onboard extender icon; instructing, via the processor, the GUI to enable the user to perform an operation while the extender device performs the onboarding onto the main APD; instructing, via the processor, the GUI to display a successful onboarding indication if the extender device onboards onto the main APD within a predetermined period of time; and instructing, via the processor, the GUI to display a failure onboarding indication if the extender device does not onboard onto the main APD within the predetermined period of time.

In some embodiments, the method includes instructing, via the processor, the extender device to onboard onto the main APD comprises instructing the extender device to onboard onto the main APD wirelessly.

In some embodiments, the method includes accessing, via the processor, the host table; and determining, via the processor, whether the extender device onboards onto the main APD within the predetermined period of time by identifying the extender device on the host table in two consecutive instances within the predetermined period of time.

In some embodiments, the method includes instructing, via the processor, the GUI to additionally display troubleshooting instructions if the extender device does not onboard onto the main APD within the predetermined period of time.

Other aspects of the present disclosure are drawn to a non-transitory, computer-readable media having computer-readable instructions stored thereon, the computer-readable instructions being capable of being read by a client device for use with a main access point device (APD), and an extender device, the main APD having a host table stored therein, having a first dedicated haul, the extender device having a second dedicated haul for communication with the client device, wherein the computer-readable instructions are capable of instructing the client device to perform the method including: instructing, via a processor configured to execute instruction stored on a memory, the GUI to display an onboarding menu including a user selectable onboard extender icon; instructing, via a processor, by way of the second dedicated haul, the extender device to onboard onto the main APD, by way of a first dedicated haul, in response to a user selection of the user selectable onboard extender icon; instructing, via the processor, the GUI to enable the user to perform an operation while the extender device performs the onboarding onto the main APD; instructing, via the processor, the GUI to display a successful onboarding indication if the extender device onboards onto the main APD within a predetermined period of time; and instructing, via the processor, the GUI to display a failure onboarding indication if the extender device does not onboard onto the main APD within the predetermined period of time.

In some embodiments, the computer-readable instructions are capable of instructing, via the processor, the extender device to onboard onto the main APD includes instructing the extender device to onboard onto the main APD wirelessly.

In some embodiments, instructions are capable of instructing the client device to perform the method further including: accessing, via the processor, the host table; and determining, via the processor, whether the extender device onboards onto the main APD within the predetermined period of time by identifying the extender device on the host table in two consecutive instances within the predetermined period of time.

In some embodiments, the computer-readable instructions are capable of instructing the client device to perform the method further including instructing, via the processor, the GUI to additionally display troubleshooting instructions if the extender device does not onboard onto the main APD within the predetermined period of time.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

When a user purchases a new Wi-Fi extender for the residence, they must onboard it to their existing network. Through the use of a client device, a user may begin onboarding the extender to the network of their main APD. The client device will connect these two devices through a backhaul. One connected, the new Wi-Fi extender will disconnect and reconnect multiple times, as it will be rebooting while updating its software. The client device waits for an unpredictably long duration of time until the Wi-Fi extender completes multiple reboots after upgrading its firmware. During this wait time, the client device cannot be used for any other tasks. This creates a poor user experience.

The idea here is to come up with a novel approach that employs the mobile app and its capabilities to provide better Wi-Fi extender onboarding user experience. The proposal in this disclosure is to use a novel technique to eliminate the long waiting time for the user while the Wi-Fi extender is completing the onboarding process in the background and thus preventing a bad user experience in terms of long wait time.

Figure 1:
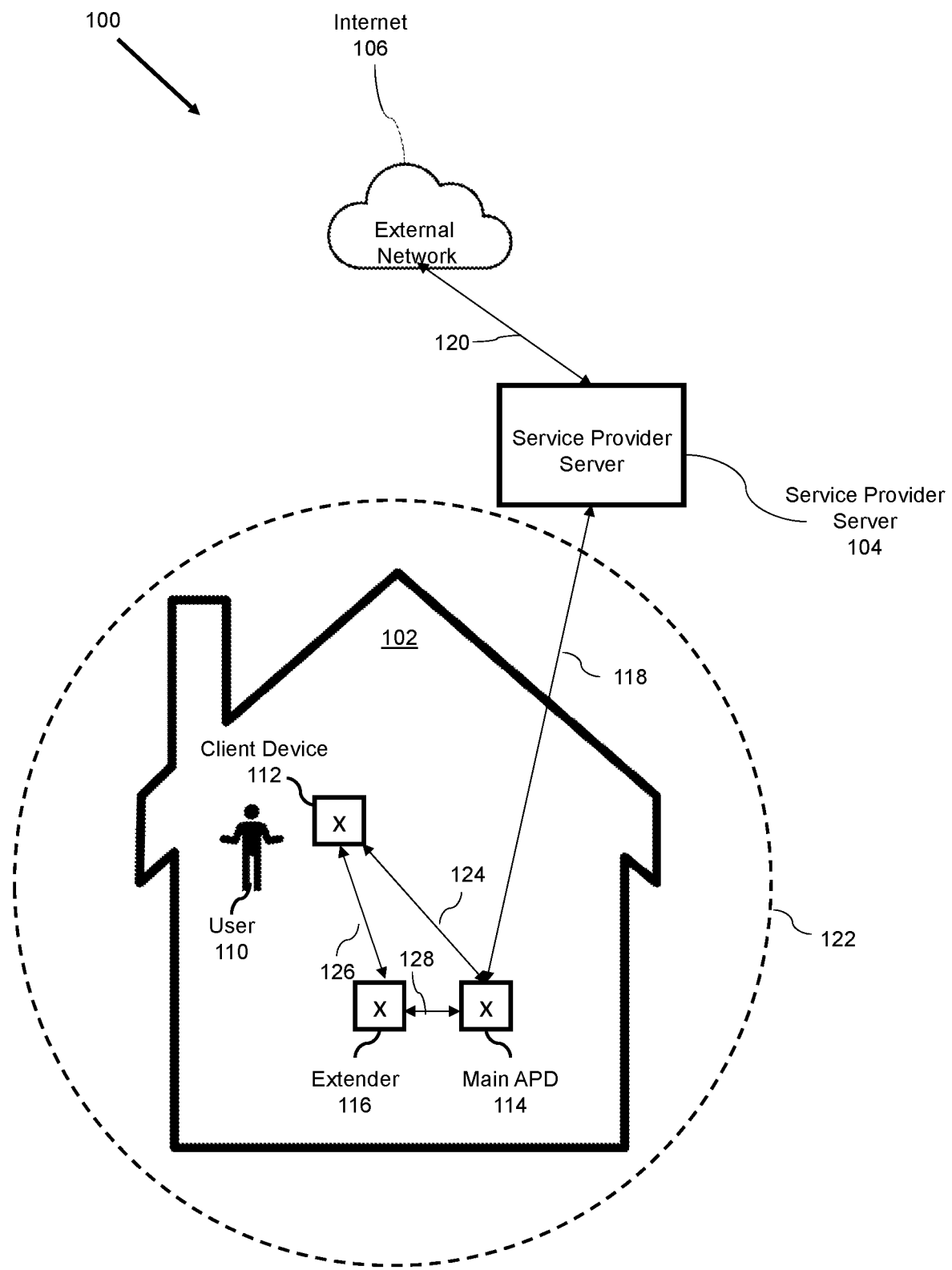
FIG. 1 illustrates a communication network.

FIG. 1 illustrates a communication network 100.

As shown in the figure, communication network 100 includes a residence 102, a service provider server 104, an external network 106, a user 110, a client device 112, a main APD 114, a Wi-Fi extender 116, physical media/wiring 118, a wireless local area network (WLAN) 122, and communication channels 120, 124, 126, and 128.

Main APD 114 is an electronic device that is to be located so as to establish a local area network (LAN) at a consumer premises. The consumer premises can include a residential dwelling, office, or any other business space of a user. The terms home, office, and premises may be used synonymously herein.

Main APD 114 may be any device or system that is operable to allow data to flow from one discrete network to another. Main APD 114 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Main APD 114 establishes, or is part of, communication network 100, using Wi-Fi for example, such that client device 112 and Wi-Fi extender 116 are able to communicate wirelessly with main APD 114. In particular, main APD 114 is able to communicate wirelessly directly with client device 112 and Wi-Fi extender 116. Further, main APD 114 is able to communicate wirelessly with Wi-Fi extender 116 via communication channel 128 and is able to communicate wirelessly with client device 112 via communication channel 126. The term Wi-Fi as used herein may be considered to refer to any of Wi-Fi 4, 5, 6, 6E, or any variation thereof.

Further, it should be noted that main APD 114 is able to communicate with service provider server 104 via physical media/wiring 118, which may optionally be a wireless communication system, such as 4G, or 5G, and further is able to connect to external network 106, e.g., the Internet, via service provider server 104.

Service provider server 104 includes head-end equipment such as server computers (e.g., automatic configuration server ACS, cable modem termination system (CMTS)) that enable a content provider, such as a cable television provider, a satellite television provider, an internet service provider, or multiple-systems operator (MSO), to provide content (such as audio/video content and/or internet service) either through physical media/wiring 118, such as a coaxial network, an optical fiber network, and/or DSL, or external network 106, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOC SIS network, a fiber optics network (e.g., FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G, for example.

Main APD 114 serves as a gateway or access point to external network 106, e.g., the Internet (or otherwise as mentioned above), for one or more electronic devices, such as client device 112, that wirelessly communicate with main APD 114 via, e.g., Wi-Fi. Client device 112 can be a desk top computer, laptop computer, electronic tablet device, smart phone, appliance, or any so-called internet of things equipped devices that are equipped to communicate information via WLAN 122.

Wi-Fi extenders 116 can be paired with main APD 114 in order to communicate wirelessly with main APD 114 and extend the coverage area of WLAN 122. Client device 112 can be in communication with main APD 114 or Wi-Fi extender 116.

Main APD 114 has the capability of wirelessly communicating with plural electronic user devices over respective communication avenues. In order to extend the area in which WLAN 122 is effective, beyond the radio reach of main APD 114, Wi-Fi extender 116 can be added. The establishment of the operative communications between Wi-Fi extender 116 and main APD 114 is referred to as onboarding the extender. Wi-Fi extender 116 can communicate wirelessly with main APD 114. However, rather than using one of the communication avenues that are allocated for communication with user devices, a dedicated avenue of communication may be established, at least at some times, between Wi-Fi extender 116 and main APD 114. This dedicated avenue is referred to as a backhaul.

Within WLAN 122, electronic devices are often referred to as being stations in WLAN 122. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 122, main APD 114 and Wi-Fi extender 116 are access points for WLAN 122.

Consider the situation where user 110 purchases Wi-Fi extender 116 for residence 102. Using client device 112, user 110 would like to connect Wi-Fi extender 116 to WLAN 122. To do this, Wi-Fi extender 116 must be onboarded to main APD 114. So, user 110 onboards Wi-Fi extender 116 onto main APD 114 using client device 112. This will be described in greater detail with reference to FIG. 2.

Figure 2:
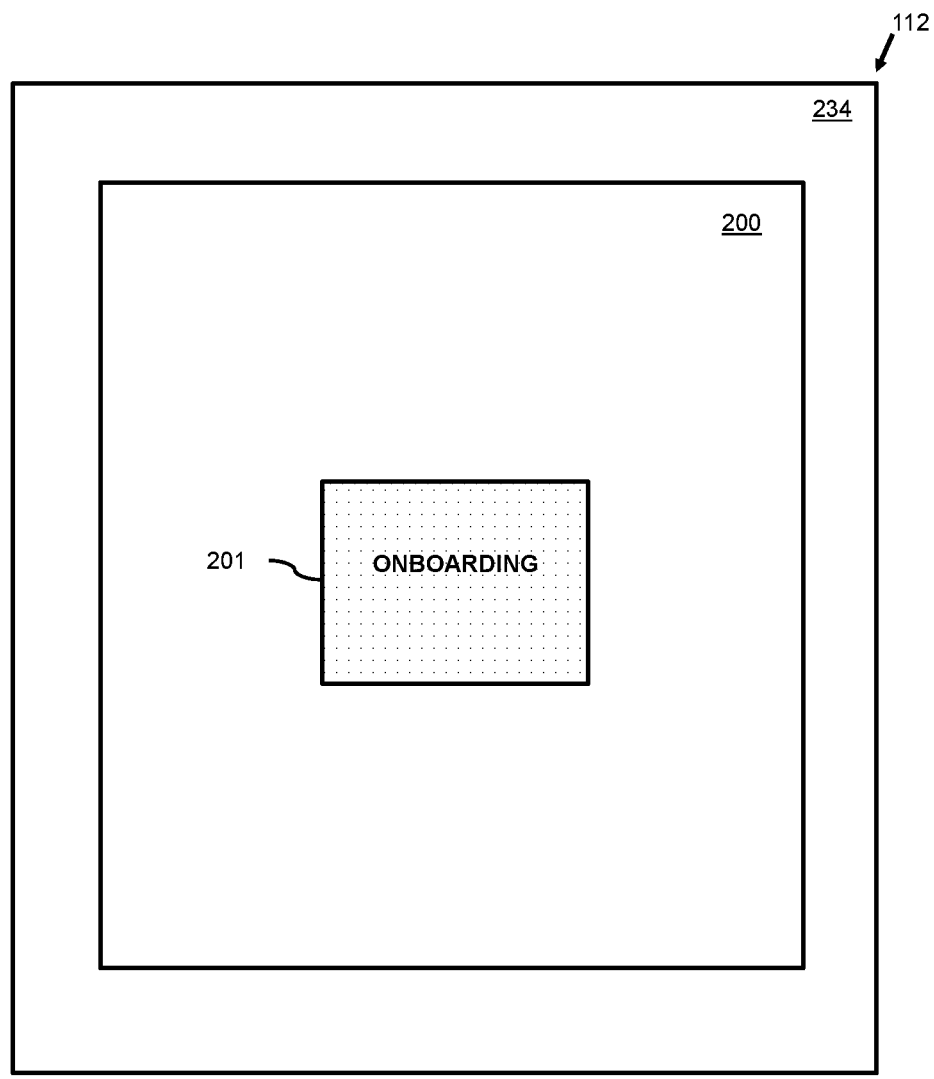
FIG. 2 illustrates a GUI displayed on a client device.

FIG. 2 illustrates a GUI 200 displayed on client device 112.

As shown in the figure, FIG. 2 illustrates GUI 200 being displayed on a display 234 of client device 112. On display 234 is icon 201.

Referencing the situation above, user 110 has begun onboarding Wi-Fi extender 116 onto main APD 114. As shown in FIG. 2, client device 112 has icon 201 displayed on display 234. This icon lets the user know that Wi-Fi extender 116 is currently onboarding main APD 114. This process may take anywhere from 5 to 7 minutes. However, in this time frame, user 110 cannot use client device 112. If user 110 wants to complete a task using client device 112, they now have to wait for the onboarding process to complete, or they can close the application which will impact the onboarding process. This process creates a poor customer experience.

What is needed is a system and method for optimizing the installation process of Wi-Fi extenders.

A system and method in accordance with the present disclosure optimizes the installation process of Wi-Fi extenders.

In accordance with the present disclosure, a user will use a client device to onboard a new Wi-Fi extender. Initially, the Wi-Fi extender will connect to a main APD by a backhaul. During this process, the extender will be connected and disconnected periodically, due to the extender updating software. This process can take anywhere from 5 to 7 minutes. While this process is going on, the user is free to use their client device however they want as the onboarding process will be happening in the background, no longer preventing the user from using their client device. When the process is complete, the user will receive a notification alerting them of the onboarding process being a success or failure.

Onboarding an extender to a main APD may be performed in any known manner, a non-limiting example of which is disclosed in U.S. utility patent application Ser. No. 16/938,305, filed Jul. 24, 2020, the entire disclosure of which is incorporated herein by reference.

An example system and method for optimizing the installation process of Wi-Fi extenders in accordance with aspects of the present disclosure will now be described in greater detail with reference to FIGS. 3-6C.

Figure 3:
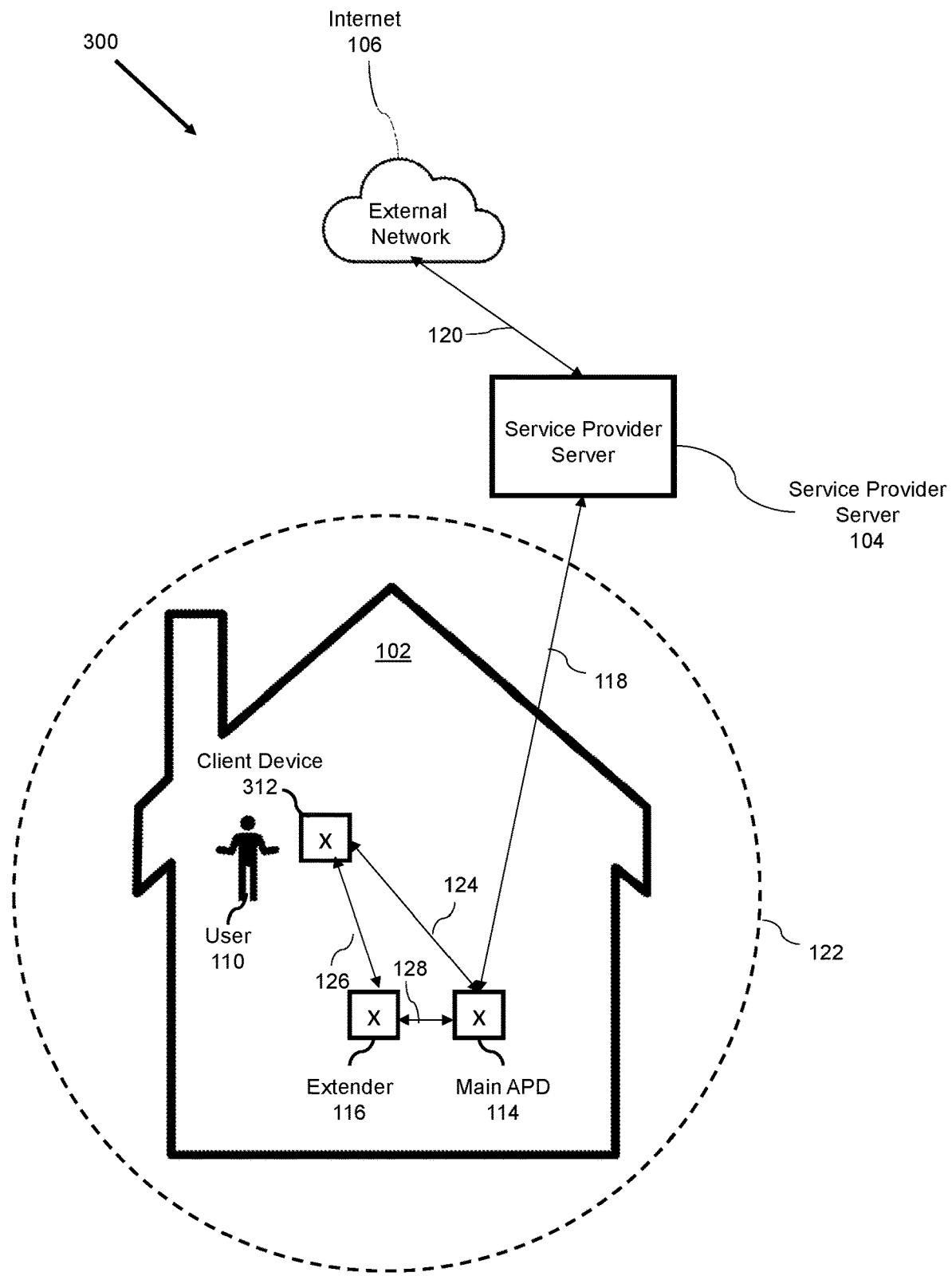
FIG. 3 illustrates a communication network, in accordance with aspects of the present disclosure.

FIG. 3 illustrates a communication network 300 in accordance with aspects of the present disclosure.

As shown in the figure, communication network 300 includes a residence 102, a service provider server 104, an external network 106, a user 110, a client device 312, a main APD 114, a Wi-Fi extender 116, physical media/wiring 118, a WLAN 122, and communication channels 120, 124, 126, and 128.

Consider the situation where user 110 purchases Wi-Fi extender 116 for residence 102. Using client device 312, user 110 would like to connect Wi-Fi extender 116 to external network 106. To do this, Wi-Fi extender 116 must be onboarded to main APD 114. So, user 110 onboards Wi-Fi extender 116 onto main APD 114 using client device 312. This will be described in greater detail with reference to FIG. 4.

Figure 4:
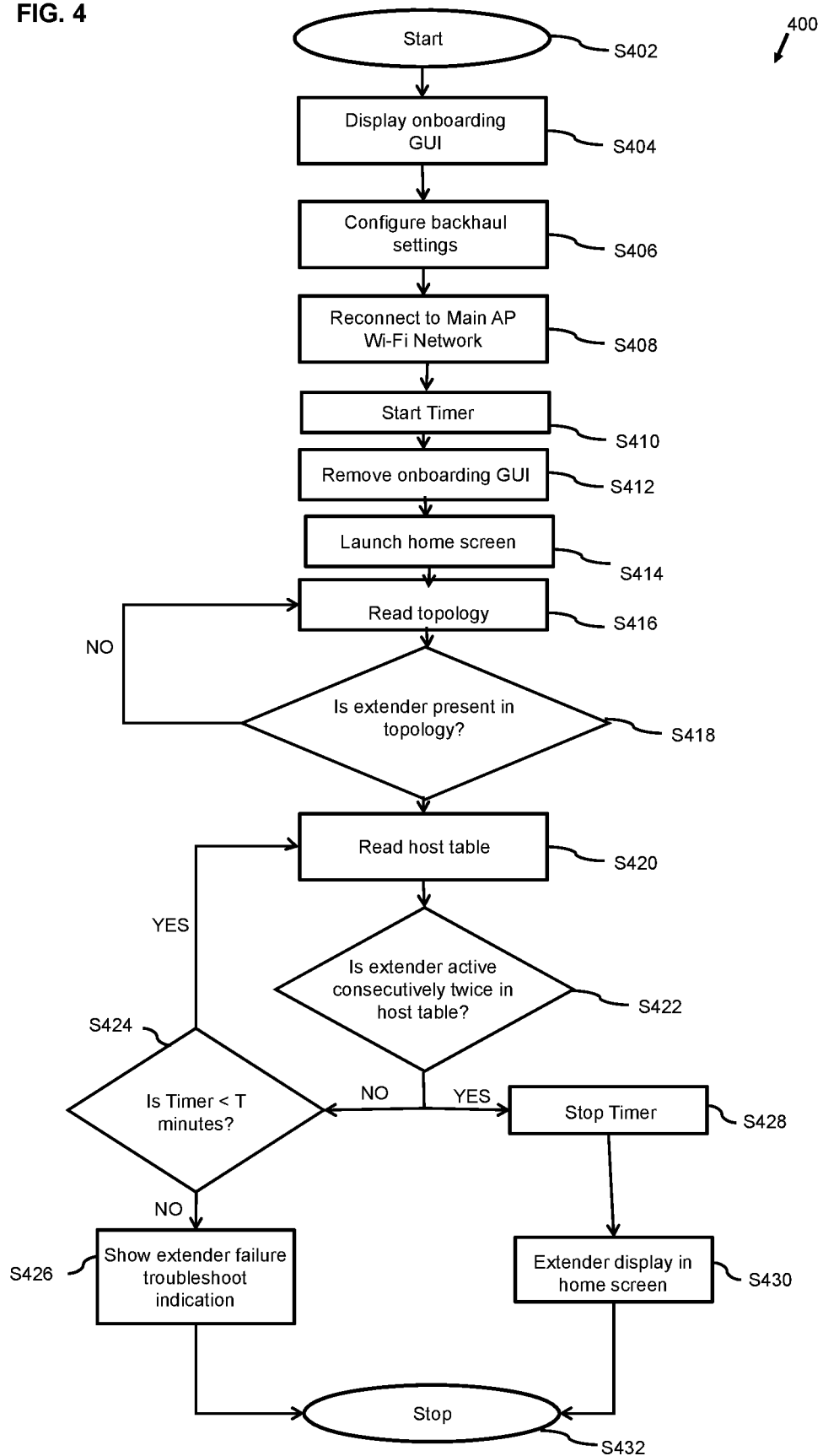
FIG. 4 illustrates an algorithm to be executed by a processor for optimizing Wi-Fi extender installation using a mobile app, in accordance with aspects of the present disclosure.

FIG. 4 illustrates an algorithm 400 to be executed by a processor for optimizing Wi-Fi extender installation using a mobile app in accordance with aspects of the present disclosure.

As shown in the figure, algorithm 400 starts (S402) and the onboarding GUI is displayed (S404). This will be discussed in greater detail with reference to FIGS. 5 and 6A.

Figure 5:
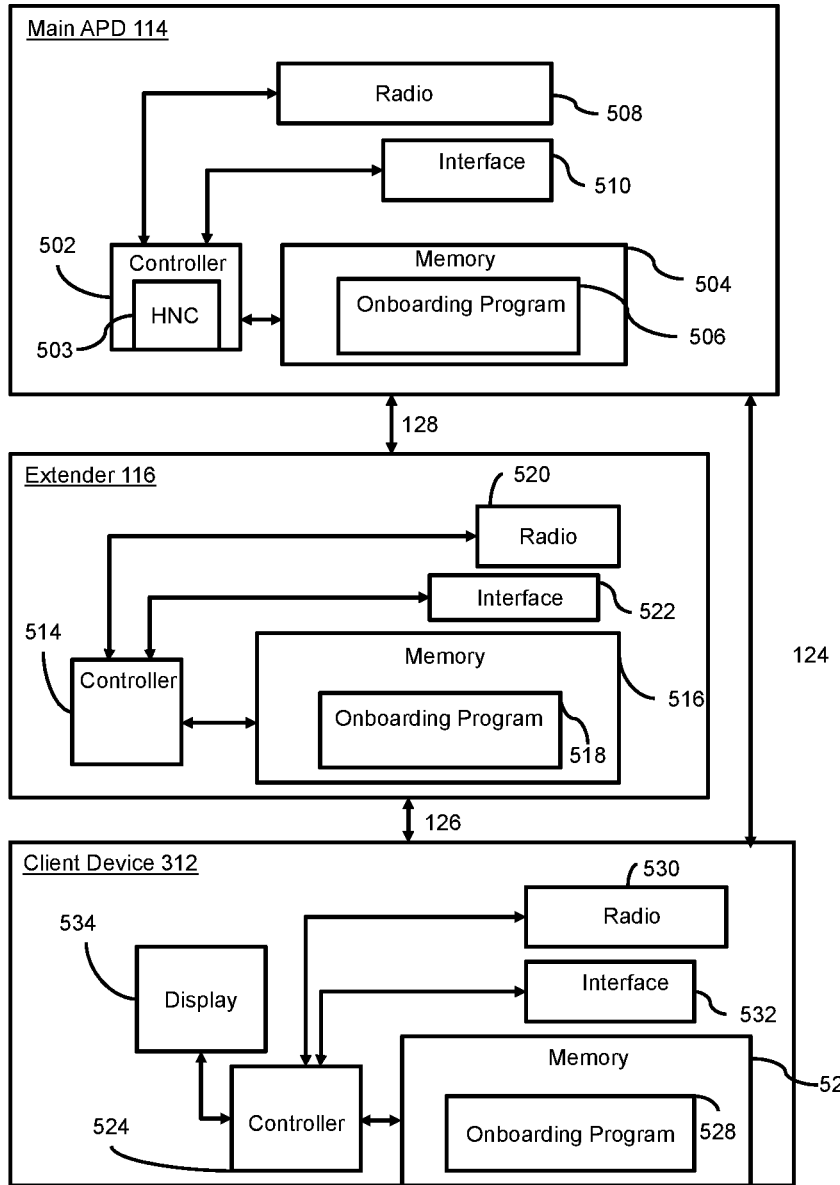
FIG. 5 illustrates an exploded view of a main APD, a Wi-Fi extender, and a client device, in accordance with aspects of the present disclosure.

FIG. 5 illustrates an exploded view of main APD 114, Wi-Fi extender 116, and client device 312.

As shown in FIG. 5, main APD 114 includes: a controller 502; a home network controller (HNC) 503; a memory 504, which has stored therein an onboarding program 506; at least one radio, a sample of which is illustrated as a radio 508; and an interface circuit 510.

In this example, controller 502, memory 504, radio 508, and interface circuit 510 are illustrated as individual devices. However, in some embodiments, at least two of controller 502, memory 504, radio 508, and interface circuit 510 may be combined as a unitary device. Whether as individual devices or as combined devices, controller 502, memory 504, radio 508, and interface circuit 510 may be implemented as any combination of an apparatus, a system and an integrated circuit. Further, in some embodiments, at least one of controller 502, memory 504 and interface circuit 510 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 502 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the main APD 114 in accordance with the embodiments described in the present disclosure.

Memory 504 can store various programming, and user content, and data including onboarding program 506. Onboarding program 506, as will be described in greater detail below, has instructions stored thereon to be executed by HNC 503 to cause main AD 114 to effectuate the onboarding of extender 116.

Interface circuit 510 can include one or more connectors, such as RF connectors, or Ethernet connectors, and/or wireless communication circuitry, such as 5G circuitry and one or more antennas. Interface circuit 510 receives content from service provider server 104 (as shown in FIG. 1) by known methods, non-limiting examples of which include terrestrial antenna, satellite dish, wired cable, DSL, optical fibers, or 5G as discussed above. Through interface circuit 510, main APD 114 receives an input signal, including data and/or audio/video content, from service provider server 104 and can send data to service provider server 104.

Radio 508, (and preferably two or more radios), may also be referred to as a wireless communication circuit, such as a Wi-Fi WLAN interface radio transceiver and is operable to communicate with client device 312 and with Wi-Fi extender 116. Radio 508 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Main APD 114 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Wi-Fi extender 116 includes: a controller 514; a main memory 516, which has stored therein an onboarding program 518; at least one radio, a sample of which is illustrated as a radio 520; and an interface 522. It should be noted that additional Wi-Fi extenders have similar structure and operation to that of Wi-Fi extender 116.

In this example, controller 514, main memory 516, radio 520 and interface 522 are illustrated as individual devices. However, in some embodiments, at least two of controller 514, main memory 516, radio 520 and interface 522 may be combined as a unitary device. Further, in some embodiments, at least one of controller 514 and main memory 516 may be implemented as a computer having tangible computer-readable media for carrying or having computer-executable instructions or data structures stored thereon.

Controller 514 may be implemented as hardware circuitry such as a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the Wi-Fi extender 116 in accordance with the embodiments described in the present disclosure.

Memory 516 can store various programming, and user content, and data including onboarding program 518. Onboarding program 518, as will be described in greater detail below, has instructions stored thereon to be executed by controller 514 to cause controller 514 to effectuate the onboarding of extender 116 onto main APD 114.

Radio 520, such as a WLAN interface radio transceiver, is operable to communicate with client device 312 and with main APD 114, as shown in FIG. 3. Radio 520 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Wi-Fi extender 116 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or the 60 GHz bands, RF4CE protocol, ZigBee protocol, Z-Wave protocol, or IEEE 802.15.4 protocol.

Interface 522 can include one or more connectors, such as RF connectors, or Ethernet connectors, and/or wireless communication circuitry, such as 5G circuitry and one or more antennas.

Client device 312 includes: a controller 524; a memory 526, which has stored therein an onboarding program 528; and at least one radio, a sample of which is illustrated as a radio 530; an interface 532 and a display 534.

In this example, controller 524, main memory 526, radio 530, interface 532 and display 534 are illustrated as individual devices. However, in some embodiments, at least two of controller 524, memory 526, radio 530, interface 532 and display 534 may be combined as a unitary device. Further, in some embodiments, at least one of controller 524 and main memory 526 may be implemented as a computer having tangible computer-readable media for carrying or having computer-executable instructions or data structures stored thereon.

Controller 524 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 312 in accordance with the embodiments described in the present disclosure.

Onboarding program 528, as will be described in greater detail below, has instructions stored thereon to be executed by controller 524 to cause client device 312 to: instruct a GUI to display an onboarding menu including a user selectable onboard extender icon; instruct, by way of the second dedicated haul, Wi-Fi extender 116 to onboard onto main APD 114, by way of a first dedicated haul, in response to a user selection of the user selectable onboard extender icon; instruct the GUI to enable user 110 to perform an operation while Wi-Fi extender 116 performs the onboarding onto main APD 114; instruct the GUI to display a successful onboarding indication if Wi-Fi extender 116 onboards onto main APD 114 within a predetermined period of time; and instruct the GUI to display a failure onboarding indication if Wi-Fi extender 116 does not onboard onto main APD 114 within the predetermined period of time.

Onboarding program 528, as will be described in greater detail below, has additional instructions stored thereon to be executed by controller 524 to cause client device 116 to instruct Wi-Fi extender 116 to onboard onto main APD 114 wirelessly.

Onboarding program 528, as will be described in greater detail below, has additional instructions stored thereon to be executed by controller 524 to cause client device 116 to: access the host table; and determine whether Wi-Fi extender 116 onboards onto main APD 114 within the predetermined period of time by identifying Wi-Fi extender 116 on the host table in two consecutive instances within the predetermined period of time.

Onboarding program 528, as will be described in greater detail below, has additional instructions stored thereon to be executed by controller 524 to cause client device 312 to instruct the GUI to additionally display troubleshooting instructions if Wi-Fi extender 116 does not onboard onto main APD 114 within the predetermined period of time.

Radio 530, may include a WLAN interface radio transceiver that is operable to communicate with client devices 312 and with Wi-Fi extender 116 as shown in FIG. 3. Radio 220 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Radio 530 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Interface 532 can include one or more connectors, such as RF connectors, or Ethernet connectors, and/or wireless communication circuitry, such as 5G circuitry and one or more antennas.

Display 534 may be any known device or system to display an image to the user.

In the event that a client device within a user's WLAN is not a client device similar to client device 312, such a client device may still include: a controller, which can include a dedicated hardware circuitry such as a dedicated control circuit, CPU, microprocessor, etc., and that controls the circuits of the client device; a main memory, which has stored therein an onboarding program, that is similar to main memory 526 and onboarding program 528, respectively, of client device 312 discussed above; a radio similar to radio 530 of mobile device 116 discussed above; in additional to further functional circuitry. Accordingly, any of the client devices may include a Wi-Fi WLAN interface radio transceiver that is operable to communicate with other client devices, with Wi-Fi extender 116 and with main APD 114, as shown in FIG. 3. Further, any of the client devices may include a radio that is similar to radio 220 of client device 312 discussed above. Still further, any of the client devices may be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol, in a manner similar to client device 312 discussed above.

Figure 6A:
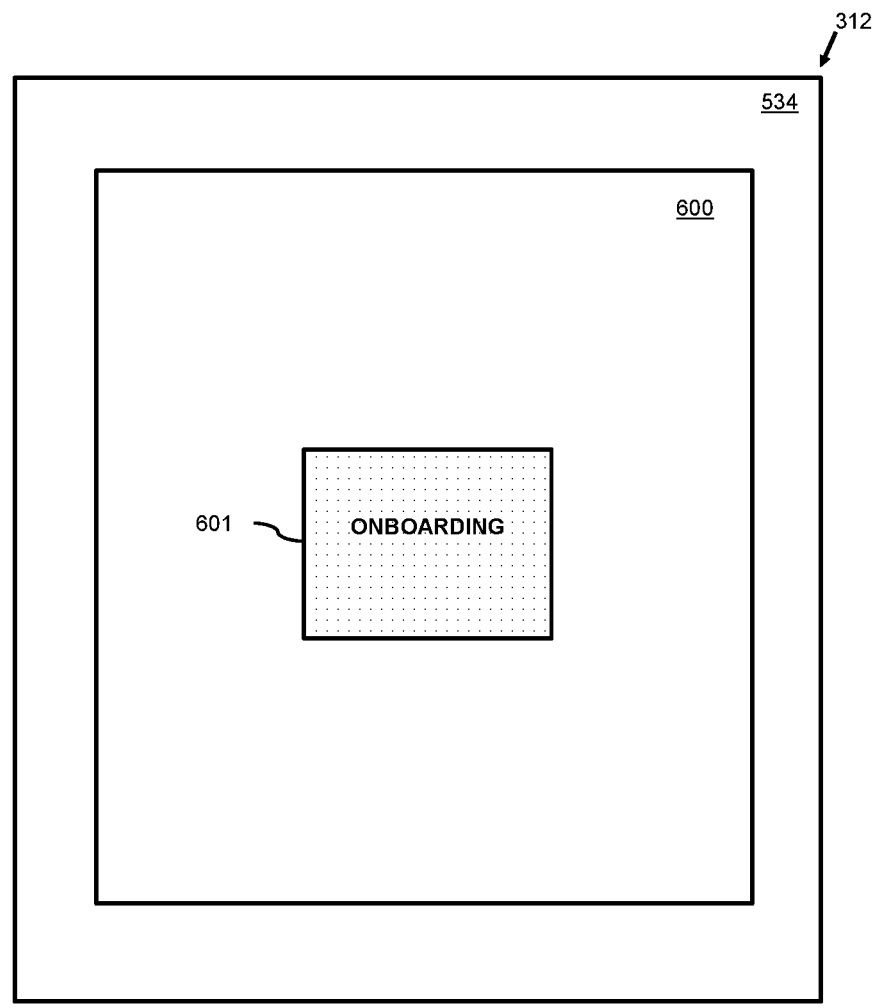
FIG. 6A illustrates a GUI at a time $t_0$ displayed on a client device, in accordance with aspects of the present disclosure.

FIG. 6A illustrates a GUI 600 at a time $t_0$ displayed on client device 312, in accordance with aspects of the present disclosure.

As shown in the figure, FIG. 6A illustrates GUI 600, being displayed on display 534 of client device 312. On display 534 is icon 601.

With reference to the example given above, user 110 is using client device 312 to begin this onboarding process. Referencing FIG. 6A, user 110 will see icon 601 on GUI 600, which is displayed on display 534. This icon indicates that the onboarding process has begun.

Returning to FIG. 4, after onboarding GUI is displayed (S404), the backhaul settings are configured (S406). For example, main APD 114 sends a signal to Wi-Fi extender 116. This will establish communication channel 128, also known as a backhaul. Communication channel 128 is a dedicated backhaul between main APD 114 and Wi-Fi extender 116, and communication channel 128 may be a wired or wireless communication channel. Client device 116 may provide user credentials associated with client device 116, non-limiting examples of which include a user ID, a password, and SSID. Main APD 114 provides these credentials to Wi-Fi extender 116 by way of communication channel 128.

Returning to FIG. 4, after the backhaul settings are configured (S406), the extender is connected to the Wi-Fi network (S408). For example, once Wi-Fi extender 116 establishes communication channel 128, a backhaul, with main APD 114, then main APD 114 is able to connect Wi-Fi extender 116 to external network 106. Wi-Fi extender 116 is connected to external network 106 by way of physical media/wiring 118, through service provider server 104, then up through communication channel 120.

Returning to FIG. 4, after the extender is connected to the Wi-Fi network (S408), a timer is started (S410). For example, as shown in FIG. 3, once client device 312 is at the home screen, a timer is started. As shown in FIG. 5, in an example embodiment, controller 524 starts and monitors the timer. This timer will continue for a predetermined period of time T to determine if the onboarding process has failed or not.

Returning to FIG. 4, after the timer is started (S410), the onboarding GUI is removed (S412). This will be described in greater detail with reference to FIG. 6B.

Figure 6B:
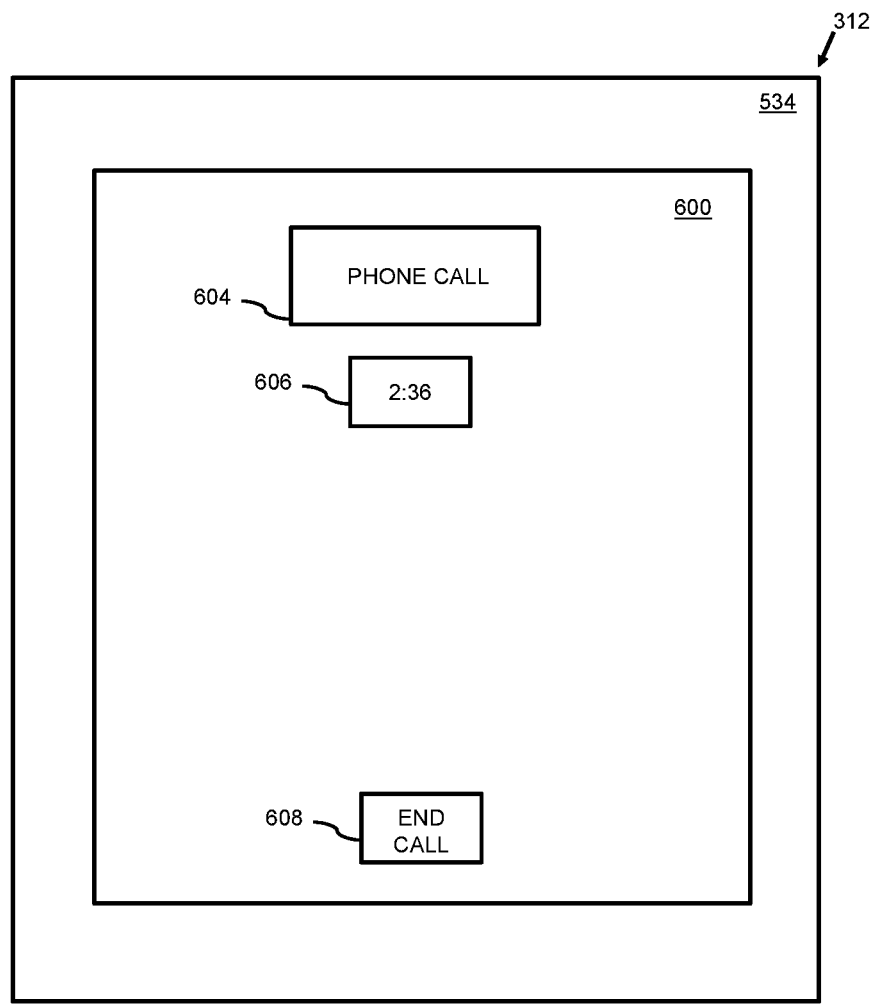
FIG. 6B illustrates a GUI at a time $t_1$ displayed on a client device, in accordance with aspects of the present disclosure.

FIG. 6B illustrates a GUI 600 at a time $t_1$ displayed on client device 312.

As shown in the figure, FIG. 6B illustrates GUI 600, being displayed on display 534 of client device 312. On display 534 are icons 604, 606, and 608.

Returning to the example above, once the timer has been started, icon 601 of FIG. 6A is removed from GUI 600. User 110 is free to use client device 312 for regular activities, a non-limiting example of which is a phone call.

Returning to FIG. 4, after the onboarding GUI is removed (S412), the home screen is launched (S414). For example, as shown in FIG. 3, once Wi-Fi extender 116 is connected to external network 106, client device 312 is able to leave the application and go to the home screen.

Returning to FIG. 4, after the home screen is launched (S414), the topology is read (S416). For example, as shown in FIG. 5, controller 524 of client device 312 may read the topology from HNC 503 in main APD 114, wherein the topology is created using the host table within memory 504 of main APD 114 and other platform information.

Returning to FIG. 4, after the topology is read (S416), it is determined whether the extender is present in the topology (S418). For example, client device 312 will determine if Wi-Fi extender 116 is present in the topology of residence 102.

Returning to FIG. 4, if it is determined that the extender is not present in the topology (N at S418), then the topology is read again (Return to S416). For example, client device will continue to loop through these steps until Wi-Fi extender 116 appears in the topology.

Returning to FIG. 4, if it is determined that the extender is present in the topology (Y at S418), then the host table is read (S420). For example, main APD 114 will list on the host table all associated devices. Once Wi-Fi extender 116 has started onboarding onto main APD 114, Wi-Fi extender 116 will be listed on the host table. Client device 312 reads the host table of main APD 114 to determine if Wi-Fi extender 116 is connected.

Returning to FIG. 4, after the host table is read (S420), it is determined whether the extender is active consecutively twice in the host table (S422). For example, client device 312 will check the host table of main APD 114 to see if Wi-Fi extender 116 appears. After, client device 312 will repeat this process and check the host table again. This is done to ensure that Wi-Fi extender 116 is connected and that there are no problems.

Returning to FIG. 4, if it is determined that the extender is not active consecutively twice in the host table (N at S422), it is determined if the timer is shorter than T minutes (S424). For example, if client device 312 discovers that Wi-Fi extender 116 has not appears consecutively twice in the host table check, then client device will check the timer.

Returning to FIG. 4, if it is determined that the timer is not shorter than T minutes (N at S424), then display the extender failure and the troubleshoot indication (S426). For example, client device 312 will check the timer and determine if it is less than T minutes. A non-limiting example of T minutes is 7 minutes. If the timer has continued for over 7 minutes, then an icon will appear on display 534 of client device 312, alerting user 110 of the onboarding failure. This will be discussed in greater detail with reference to FIG. 6C.

Returning to FIG. 4, after displaying the extender failure and the troubleshoot indication (S426), then algorithm 400 stops (S432). For example, after user 110 is alerted of the onboarding failure of Wi-Fi extender 116, algorithm 400 will end.

Returning to FIG. 4, if it is determined that the timer is shorter than T minutes (Y at S424), then the host table is read again (Return to S420). For example, if T minutes is 7 minutes, and the timer has only been on for 3 minutes, then client device 312 will begin checking the host table for Wi-Fi extender 116 to appear consecutively twice.

Returning to FIG. 4, after it is determined that the extender is active consecutively twice in the host table (Y at S422), then the timer is stopped (S428). For example, if client device 312 finds Wi-Fi extender 116 twice consecutively in the host table, then the timer can stop, as Wi-Fi extender 116 has successfully onboarded.

Returning to FIG. 4, after the timer is stopped (S428), display that extender is successfully connected (S430). This will be described in greater detail with reference to FIG. 6C.

Figure 6C:
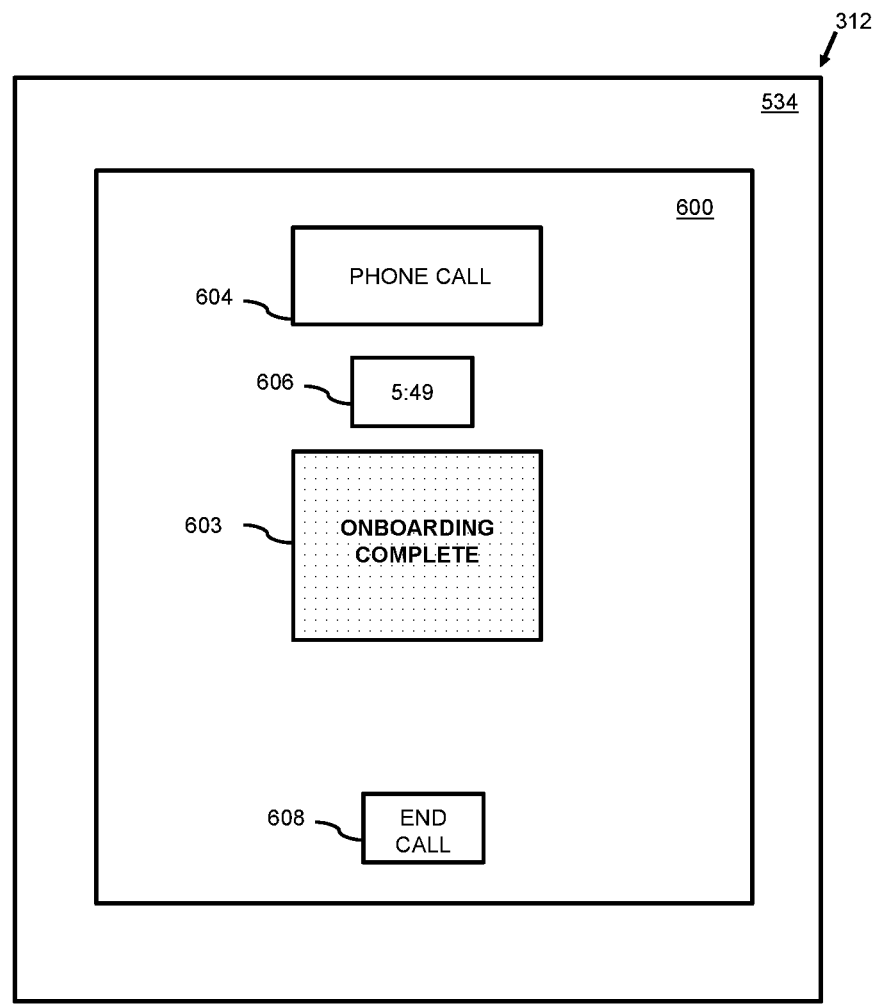
FIG. 6C illustrates a GUI at a time $t_2$ displayed on a client device, in accordance with aspects of the present disclosure.

FIG. 6C illustrates a GUI 600 at a time $t_2$ displayed on client device 312.

As shown in the figure, FIG. 6C illustrates GUI 600, being displayed on display 534 of client device 312. On display 534 are icons 603, 604, 606, and 608.

Returning to the example above, assume user 110 is using their phone to do a task, a non-limiting example of which is a phone call. Once Wi-Fi extender 116 is officially onboarded, a message will be relayed to user 110. As shown in FIG. 6C, icon 603 appeared on display 534, alerting user 110 that Wi-Fi extender 116 onboarded successfully.

In some embodiments, as described above, the onboarding process will fail. With reference to FIG. 6C, in such embodiments where onboarding fails, icon 603 would alert user 110 that the onboarding process has failed, not succeeded.

Returning to FIG. 4, after displaying that extender successfully connected (S430), algorithm 400 ends (S432). For example, once user 110 receives the successful onboarding message, algorithm 400 stops.

When a user purchases a new Wi-Fi extender for the residence, they must onboard it to their existing network. Through the use of a client device, a user may begin onboarding the extender to the network of their main APD. The client device will connect these two devices through a backhaul. One connected, the new Wi-Fi extender will disconnect and reconnect multiple times, as it will be rebooting while updating its software. The client device waits for an unpredictably long duration of time until the Wi-Fi extender completes multiple reboots after upgrading its firmware. During this wait time, the client device cannot be used for any other tasks. This creates a poor user experience.

In accordance with the present disclosure, a user will use a client device to onboard a new Wi-Fi extender. Initially, the Wi-Fi extender will connect to a main APD by a backhaul. During this process, the extender will be connected and disconnected periodically, due to the extender updating software. This process can take anywhere from 5 to 7 minutes. While this process is going on, the user is free to use their client device however they want as the onboarding process will be happening in the background, no longer preventing the user from using their client device. When the process is complete, the user will receive a notification alerting them of the onboarding process being a success of failure.

Thus, the present disclosure as disclosed prevents the user's client device from being affected by the long wait time of onboarding a new extender, and it alerts the user of the outcome of the onboarding process.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A client device for instructing an extender device to onboard, the client device comprising:
    a memory;
    a graphic user interface (GUI); and
    a processor configured to execute instructions stored on the memory to cause the client device to:
        instruct the extender device to onboard onto a main access point device (APD) in response to a user selection of a user selectable onboard extender icon of the GUI, wherein after an onboarding process is begun, the client device is free to be used for an activity; and
        instruct the GUI to display an onboarding indication based on whether the extender device is identified on a host table in two consecutive instances within a predetermined period of time.

2. The client device of claim 1, wherein the processor is configured to execute instructions stored on the memory to additionally cause the client device to instruct the extender device to onboard onto the main APD wirelessly.

3. The client device of claim 1, wherein the onboarding indication is a success onboarding identification.

4. The client device of claim 1, wherein the onboarding indication is a failure onboarding indication.

5. The client device of claim 4, wherein the processor is configured to execute instructions stored on the memory to additionally cause the client device to instruct the GUI to additionally display troubleshooting instructions.

6. The client device of claim 1, wherein the client device is a remote processing device in a distributed cloud computing environment.

7. The client device of claim 1, wherein the processor is further configured to execute the instructions to further cause the client device to:
    start a timer;
    check the timer;
    wherein the instructing the GUI to display an onboarding indication is further based on the checking the timer.

8. A method for a client device to instruct an extender device to onboard, the method comprising:
    instructing the extender device to onboard onto a main access point device (APD) in response to a user selection of a user selectable onboard extender icon of the GUI, wherein after an onboarding process is begun, the client device is free to be used for an activity; and
    instructing the GUI to display an onboarding indication based on whether the extender device is identified on a host table in two consecutive instances within a predetermined period of time.

9. The client device of claim 8, wherein the processor is configured to execute instructions stored on the memory to additionally cause the client device to instruct the extender device to onboard onto the main APD wirelessly.

10. The client device of claim 8, wherein the onboarding indication is a success onboarding identification.

11. The client device of claim 8, wherein the onboarding indication is a failure onboarding indication.

12. The client device of claim 11, wherein the processor is configured to execute instructions stored on the memory to additionally cause the client device to instruct the GUI to additionally display troubleshooting instructions.

13. The client device of claim 8, wherein the client device is a remote processing device in a distributed cloud computing environment.

14. The client device of claim 8, wherein the processor is further configured to execute the instructions to further cause the client device to:
   start a timer;
   check the timer;
   wherein the instructing the GUI to display an onboarding indication is further based on the checking the timer.

15. A non-transitory computer-readable medium storing a one or more computer-readable instructions for a client device to instruct an extender device to onboard, the one or more computer-readable instructions when executed by a processor of the client device cause client device to perform one or more operations comprising:
   instructing the extender device to onboard onto a main access point device (APD) in response to a user selection of a user selectable onboard extender icon of the GUI, wherein after an onboarding process is begun, the client device is free to be used for an activity; and
   instructing the GUI to display an onboarding indication based on whether the extender device is identified on a host table in two consecutive instances within a predetermined period of time.

16. The client device of claim 15, wherein the processor is configured to execute instructions stored on the memory to additionally cause the client device to instruct the extender device to onboard onto the main APD wirelessly.

17. The client device of claim 15, wherein at least one of:
   the onboarding indication is a success onboarding identification;
   the client device is a remote processing device in a distributed cloud computing environment.

18. The client device of claim 15, wherein the onboarding indication is a failure onboarding indication.

19. The client device of claim 18, wherein the processor is configured to execute instructions stored on the memory to additionally cause the client device to instruct the GUI to additionally display troubleshooting instructions.

20. The client device of claim 15, wherein the processor is further configured to execute the instructions to further cause the client device to:
   start a timer;
   check the timer;
   wherein the instructing the GUI to display an onboarding indication is further based on the checking the timer.

* * * * *